(12) United States Patent
Cern

(10) Patent No.: US 7,061,370 B2
(45) Date of Patent: Jun. 13, 2006

(54) HIGH CURRENT INDUCTIVE COUPLER AND CURRENT TRANSFORMER FOR POWER LINES

(75) Inventor: Yehuda Cern, Brookline, MA (US)

(73) Assignee: Ambient Corporation, Newton, MA (US)

(*) Notice: Subject to any disclaimer, the term of this patent is extended or adjusted under 35 U.S.C. 154(b) by 338 days.

(21) Appl. No.: 10/425,816

(22) Filed: Apr. 29, 2003

(65) Prior Publication Data

US 2003/0201873 A1 Oct. 30, 2003

Related U.S. Application Data

(60) Provisional application No. 60/416,603, filed on Oct. 7, 2002, provisional application No. 60/376,377, filed on Apr. 29, 2002.

(51) Int. Cl.
*G05B 11/01* (2006.01)
(52) U.S. Cl. .............. 340/310.07; 340/310.06; 340/310.02; 340/310.05; 323/222; 363/21.01
(58) Field of Classification Search .......... 340/310.07, 340/310.06, 310.01, 310.02, 310.03, 310.05; 323/222; 363/21.01
See application file for complete search history.

(56) References Cited

U.S. PATENT DOCUMENTS

| 4,295,175 A | * | 10/1981 | Cordray | .............. 361/69 |
|---|---|---|---|---|
| 4,346,340 A | | 8/1982 | Hackett-Jones et al. | |
| 4,369,416 A | * | 1/1983 | Zapp et al. | ............. 333/175 |
| 4,408,186 A | | 10/1983 | Howell | |
| 4,420,752 A | | 12/1983 | Davis et al. | |
| 4,745,391 A | | 5/1988 | Gajjar | ............. 340/310 |
| 5,406,249 A | * | 4/1995 | Pettus | ............. 370/389 |
| 5,986,860 A | * | 11/1999 | Scott | ............. 361/42 |
| 6,088,205 A | * | 7/2000 | Neiger et al. | ............. 361/42 |
| 6,160,374 A | | 12/2000 | Hayes et al. | |
| 6,377,479 B1 | * | 4/2002 | Ayano et al. | ............. 363/40 |
| 6,529,120 B1 | * | 3/2003 | Bilenko et al. | ............. 375/130 |
| 6,563,420 B1 | * | 5/2003 | Brown et al. | ............. 455/41.1 |

OTHER PUBLICATIONS

European Search Report dated Mar. 30, 2005.

* cited by examiner

*Primary Examiner*—Jeffery Hofsass
*Assistant Examiner*—Daniel Previl
(74) *Attorney, Agent, or Firm*—Ohlandt, Greeley, Ruggiero & Perle, LLP

(57) ABSTRACT

There is provided an inductive power line data coupler. The coupler includes (a) a magnetic core having a high magnetic permeability at a data communication frequency and being configured to allow a power line of a power distribution system to be routed through the magnetic core to serve as a primary winding, (b) a data signaling circuit that provides a secondary winding through the magnetic core for coupling a data signal between the power line and a communication device, and (c) a choke coil coupled to the data signaling circuit for creating a flux-canceling power frequency current opposite in direction and comparable in magnitude to a power frequency current. The coupler may also include a circuit for sensing a level of current in the power line.

25 Claims, 10 Drawing Sheets

HIGH CURRENT INDUCTIVE COUPLER AND CURRENT TRANSFORMER FOR POWER LINES

CROSS REFERENCE TO RELATED APPLICATIONS

The present application is claiming priority of (a) U.S. Provisional Patent Application Ser. No. 60/376,377, filed on Apr. 29, 2002, and (b) U.S. Provisional Patent Application Ser. No. 60/416,603, filed on Oct. 7, 2002.

BACKGROUND OF THE INVENTION

1. Field of the Invention

The invention generally relates to power line communications, and more particularly, to avoiding magnetic saturation in a power line inductive coupler.

2. Description of the Related Art

In a power line communication system, power frequency is typically in a range of 50–60 Hertz and a data communication signal frequency is typically in a range of 1–50 MHz. An inductive coupler for coupling modulated data onto and off of power lines includes a magnetic core through which pass the power line and a secondary winding. This is described, for example, in patent application Ser. No. 09/752,705, filed Dec. 28, 2000, patent application Ser. No. 10/082,063, filed Feb. 25, 2002, and provisional patent application No. 60/364,321, filed Mar. 14, 2002, which are incorporated herein by reference. One limitation to the usage of such couplers on high current primary and secondary wires is the limited ability of the magnetic cores to withstand large magnetization currents without magnetic saturation.

Saturation degrades performance in two ways. First, saturation reduces the magnetization inductance, which increases the shunt admittance loading on the data signal. Second, the instantaneous magnitude of power line current rises from zero to a peak value twice each cycle on ac power lines, and the data signal is amplitude modulated at twice the power line frequency and harmonics of this double frequency. So if the modulation depth exceeds some particular value, this modulation causes data errors.

One way to minimize core saturation is to introduce one or more air gaps in the magnetic circuit of the core, thus increasing magnetic resistance and permitting higher currents to flow before saturation is encountered. But the inductances of the primary and secondary windings fall in proportion to the total magnetic resistance, so a wide air gap would imply an impracticably large mass of core would be needed to have a minimum acceptable magnetization inductance. Increasing the number of turns is also impractical, because the coupler is usually installed on large diameter power lines without interrupting the power circuit.

SUMMARY OF THE INVENTION

A representative embodiment of the present invention includes a power line data coupler that couples a high frequency data signal between a power distribution system and a modem device. A high-frequency magnetic core has a high magnetic permeability at data communications frequencies. A data signaling secondary circuit couples a data signal between a power line primary winding of a power distribution system and a communications modem device. An inductive data coupler may be viewed as a transformer, with a power wire passing through coupler core acting as a primary winding and a coupler winding acting as a secondary. By terminating the secondary with a low value of power frequency impedance, such as a choke coil, primary current induces secondary current opposite in direction and comparable in magnitude to primary power frequency current. As a secondary current is induced in the opposite direction from the primary current, this secondary current cancels some of the power frequency flux induced in the coupler cores.

In one embodiment, the flux-canceling secondary circuit is short-circuited at power frequencies, using a choke inductor having a relatively low impedance at power frequencies and a relatively high impedance at data communication frequencies. Such a secondary circuit may also include a spark gap or gas tube surge arrestor connected in parallel with the choke inductor. The flux-canceling secondary circuit may be designed to have a total impedance much lower than half the magnetization reactance of the transformer secondary winding. The lower the impedance connected to the secondary, the closer the magnitude of the secondary current will approach the magnitude of the power line current.

The data signaling secondary winding may be wound over the high frequency magnetic core. The secondary winding of the flux-canceling secondary circuit may have multiple turns. It also may be connected to electrical ground, for example, by a center tap.

In another embodiment, an additional low-frequency magnetic core that has a high magnetic permeability at power line power frequencies may be used in conjunction with the high frequency core. The data signaling secondary winding may be wound over the high frequency magnetic core, but not over the low frequency magnetic core. The low frequency magnetic core may be selected to saturate at a maximum power line current level. Such saturation may limit the maximum power frequency current that may be induced in the secondary winding, and prevent its overheating.

A further embodiment of the present invention also includes a system for sensing current on a power distribution system power line. A first current transformer has a power distribution system power line as its primary winding and a coupler secondary coil as its secondary winding. Current in the coupler secondary coil is opposite in direction and proportional to power current in the power line. A second current transformer has the choke coil which is connected to the secondary winding as its primary winding and develops in its secondary winding circuit a current sensing signal proportional to the power current.

In yet a further embodiment, the flux-canceling coil is connected to electrical ground so that in case of insulation failure of the secondary winding, any fault current is shunted directly to ground. The second current transformer may then be located proximal to the ground connection. A signal acquisition device may be included for converting the current sensing signal to a representative digital value. The representative digital value may be provided to a computer network. A proportionality compensating mechanism may also be included for maintaining a relatively constant ratio between the current sensing signal and the power current as magnitude of the power current changes.

In another embodiment, the second current transformer may be replaced by a coil whose winding is coaxial with the choke coil. The coil thus acts as a power frequency current sensor.

BRIEF DESCRIPTION OF THE DRAWINGS

The invention will be better understood by reference to the following detailed description and the accompanying drawings, in which.

DESCRIPTION OF THE INVENTION

The magnitude of primary power line current that can be accommodated before an onset of significant core saturation can be greatly increased by providing a secondary winding in which flows power frequency current in a direction opposite to the primary power line current. In a secondary winding whose terminals are connected to each other via a short circuit or very low impedance, a current is induced, of magnitude nearly equal to that of the primary current. Under these conditions, a magnetomotive force driving a core, through which the primary and secondary windings are routed, will be reduced to an algebraic sum of respective current-times-number-of-turns in the primary and secondary windings, and be much lower than the primary current alone. This permits an increase of allowable primary current, before saturation begins.

The conditions needed to induce substantial current in the secondary winding include limiting impedance in the shorted winding circuit to be much less than a magnetization inductance of the transformer comprising the primary and secondary windings and their common magnetic core. However, for a high frequency powerline coupler, a radio frequency (rf) choke must be connected in series with this shorted winding to avoid short circuiting the high frequency signal induced from the primary winding. The rf choke, carrying power frequency current almost as great as the primary current, must not saturate at the highest rated current. Such an rf choke coil may be wound on a nonmagnetic core or optionally include a magnetic core shaped to include a large non-magnetic component in its flux path.

Figure 1A:
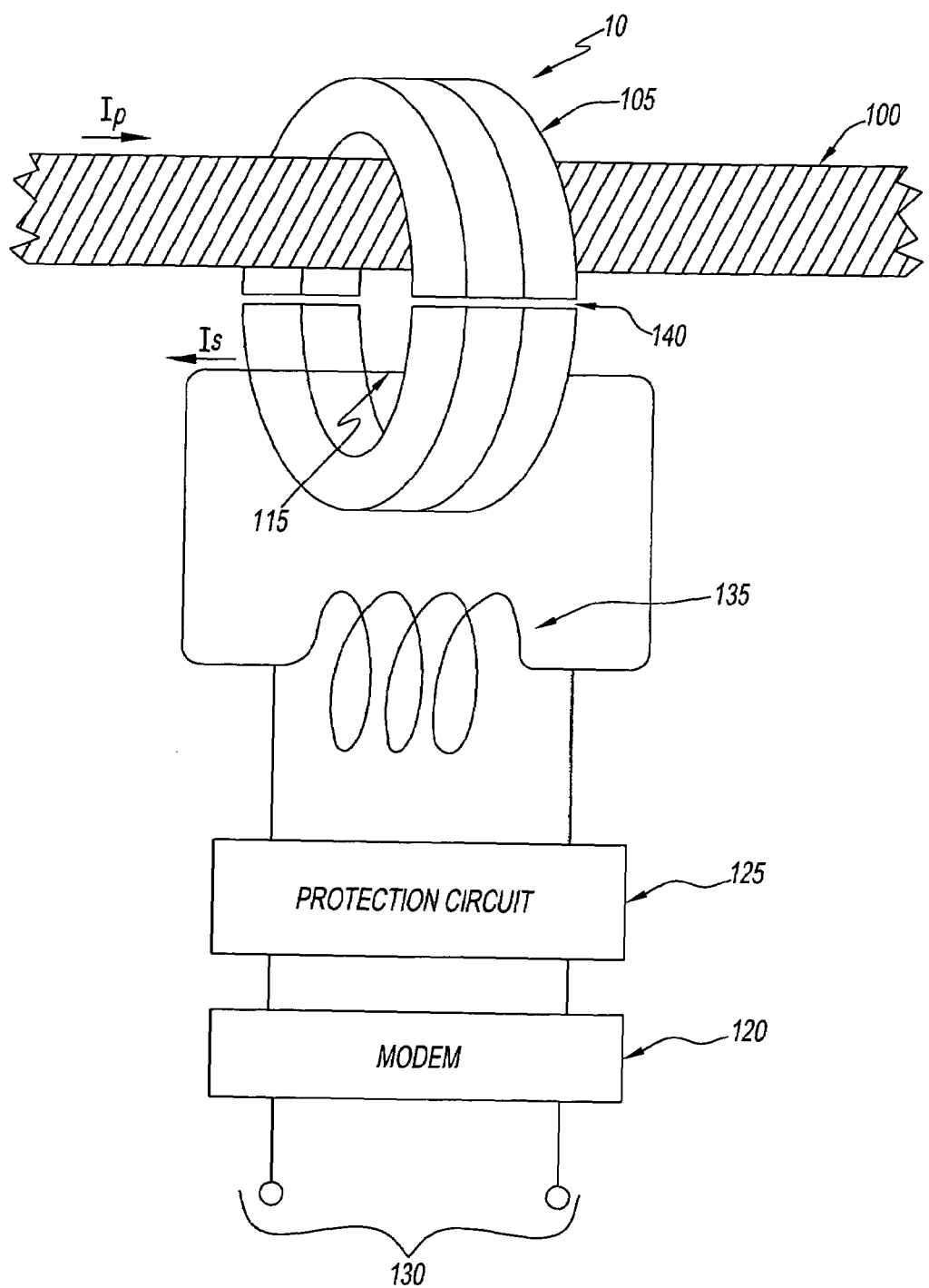
FIG. 1a shows a structure of an embodiment of the invention in which a single secondary winding functions as a bi-directional signal winding and a flux-canceling shorted winding.

FIG. 1a shows the structure of one embodiment of an inductive coupler, generally represented by the numeral 10, in which a single secondary winding functions as a bi-directional signal winding and a flux-canceling shorted winding. Inductive coupler 10 includes cores 105, a secondary 115 and a choke coil 135. A power line 100 of a power distribution system is routed through cores 105 as a primary winding.

Cores 105, which are high frequency cores, are configured so that they may be placed around power line 100 while power line 100 is energized. For example, cores 105 may be horseshoe-shaped, or they may be split toroid cores to facilitate placing coupler 10 over power line 100. Opposing pole faces where opposing split cores meet may be in contact with each other. Optionally, a gap 140 of nonmagnetic material may be introduced between them, commonly termed an air gap. Core 105 is a magnetic core having a high magnetic permeability at a data communication frequency.

Secondary 115 is electrically insulated and passes through cores 105, and connects to a communication device, e.g., a modem 120, via an impedance matching and surge protection circuit 125. Thus, secondary 115 serves as a data signaling circuit for coupling a data signal between power line 100 and modem 120. Modem 120 is further coupled for bi-directional data communication with a communication system (not shown) via data terminals 130.

Choke coil 135 is a high frequency choke inductor connected across secondary 115 to present a low impedance for power frequency current and a high impedance for data communication frequency currents. Choke coil 135 is also part of a flux-canceling circuit for creating a flux-canceling power frequency current opposite in direction and comparable in magnitude to a power frequency current. The impedance of coil 135 should be small in comparison with the magnetization impedance of secondary 115, so as to increase the ratio of secondary current to primary power line current. The magnitude of the flux-canceling current may exceed one third of the power line current, preferably approaching equality to the power line current.

In operation, a power frequency current $I_p$ flows in power line 100, and induces a current $I_S$ in secondary 115 that flows in the opposite direction from $I_p$. With directions of $I_p$ and $I_S$ as shown in FIG. 1a, cores 105 are subjected to a magnetomotive force of $I_p$-$I_S$, which is considerably less than $I_p$ alone. $I_p$ may thus be increased before cores 105 reach significant saturation.

Conflicting demands of minimal signal loading of the secondary circuit by means of a high impedance radio frequency choke and minimizing power frequency impedance by limiting choke impedance, can be overcome as follows.

Figure 1B:
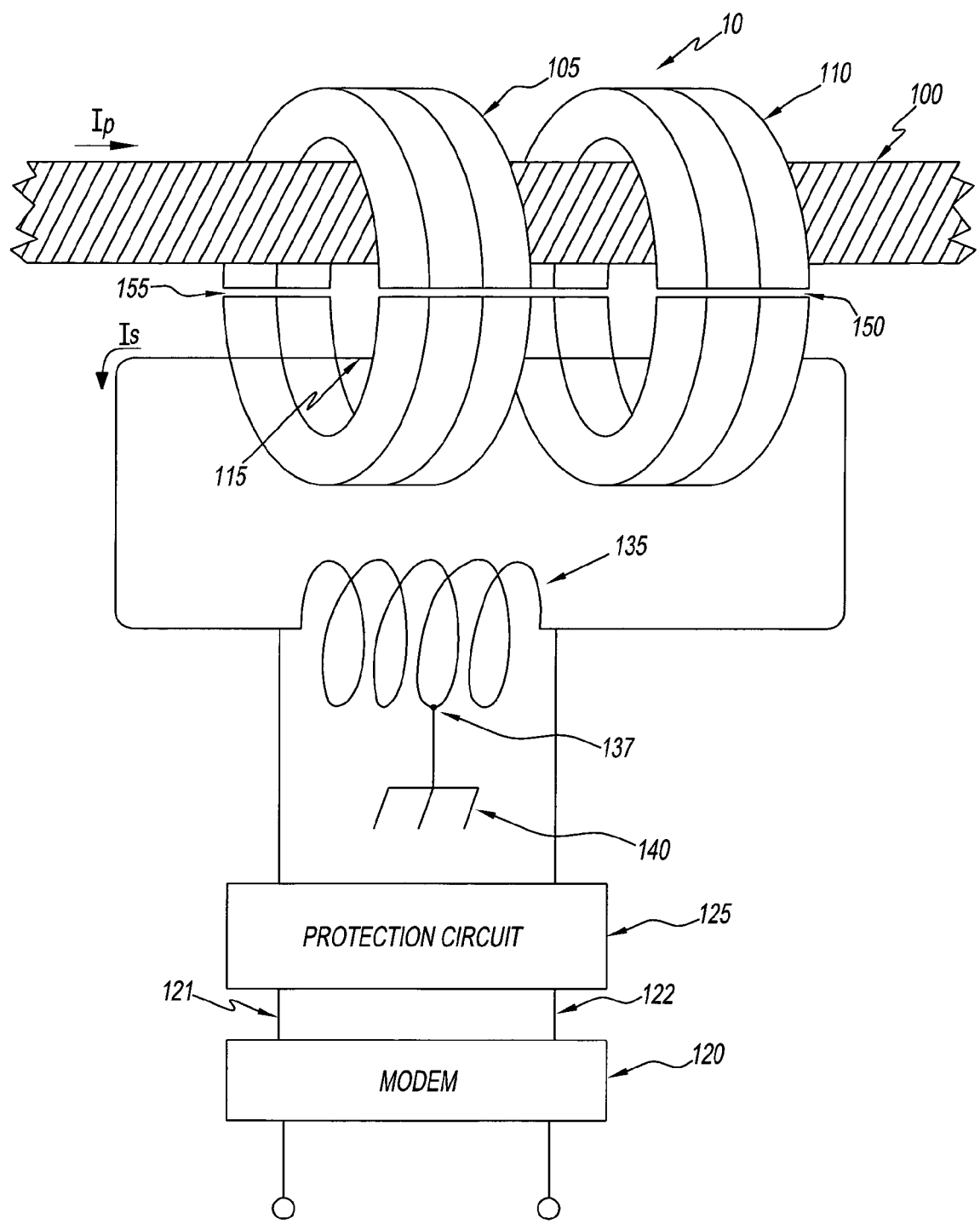
FIG. 1b shows a further embodiment that adds a low frequency magnetic core.

FIG. 1b shows an embodiment in which one or more low-frequency, high-permeability cores 110 can be placed next to the high-frequency cores 105 of coupler 10, taking care to ensure that high frequency eddy current losses are minimized in the added cores 110. Typical low frequency magnetic core materials increase the power frequency impedances while having little effect on the radio frequency impedance. Cores 110 increase the magnetization impedance of secondary 115 for power frequencies while not significantly affecting its impedance at signal frequencies. As shown in FIG. 1b, one or more cores 110 are placed alongside cores 105. Cores 110 are magnetic cores having a permeability of thousands at the power frequency and nearly unity at the signal frequency. Secondary 115 and is connected in series with choke coil 135.

Cores 110 reduce a ratio of the power frequency impedance of choke coil 135 to the power frequency impedance of secondary 115 as compared to a ratio that would exist for the embodiment shown in FIG. 1a. This ratio reduction increases a ratio of secondary power frequency current to the primary power frequency current, and thus increases flux cancellation and the level of primary current that can be accommodated without encountering saturation in the high frequency cores 105. Air gaps 150 and 155 may be used in either or both cores 110 and 105, respectively.

In an alternative embodiment, secondary 115 may have more than one turn around cores 105 and/or cores 110, but all of the flux cancellation effects described above still pertain.

FIG. 1b also shows choke coil 135 configured with multiple turns with a connection of a center tap 137 of choke coil 135 to electrical ground 140. This is a safety connection that provides a path for any fault current, should there be a breakdown of insulation between power line 100 and secondary 115. Ground 140 is typically a grounding rod at the base of the electric pole (not shown) nearest coupler 10. A wire running up the electric pole from the grounding rod is also connected to any neutral wires present at that pole. Connecting ground 140 to center tap 137 provides a symmetrical path for any high frequency noise that may be present on ground 140 to each of two modem terminals 121 and 122, and cancellation of the noise by the factor of the common mode rejection ratio of modem 120.

Figure 2A:
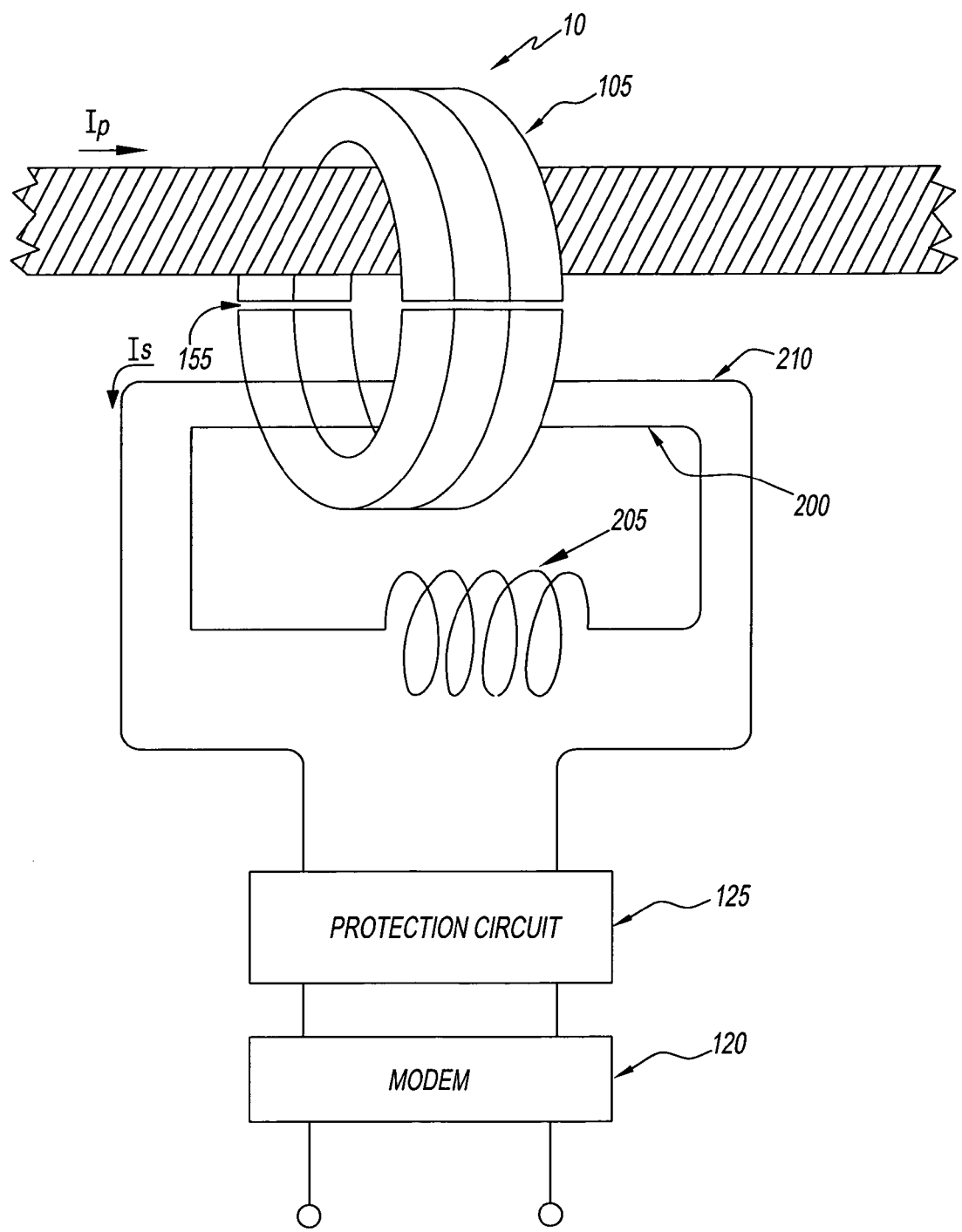
FIGS. 2a and 2b show alternative embodiments with a tertiary winding.

FIG. 2a shows the structure of an alternative implementation intended to increase the maximum level of power line current while maintaining data coupler functionality. Here, a separate winding, a tertiary winding, is used to induce a power frequency current in the opposite direction from that flowing in the power wire. It includes a choke acting as a low impedance at power frequency and a high impedance at signal frequency, which prevents the tertiary winding from acting as a shorted winding and thus short-circuiting the signal.

Power line 100 can be considered as a one-turn winding passing through core 105. A secondary winding 210 functions only as a signal frequency winding and connects to modem 120 via impedance matching and surge protection circuit 125. In contrast with FIGS. 1a and 1b, tertiary winding 200 is added, dedicated to inducing current so as to cancel a significant portion of the flux in core 105. Tertiary winding 200 is terminated by a high current, signal frequency choke 205, similar to choke coil 135 in FIGS. 1a and 1b, which forms a short circuit for power frequency but not for signal frequency.

Figure 2B:
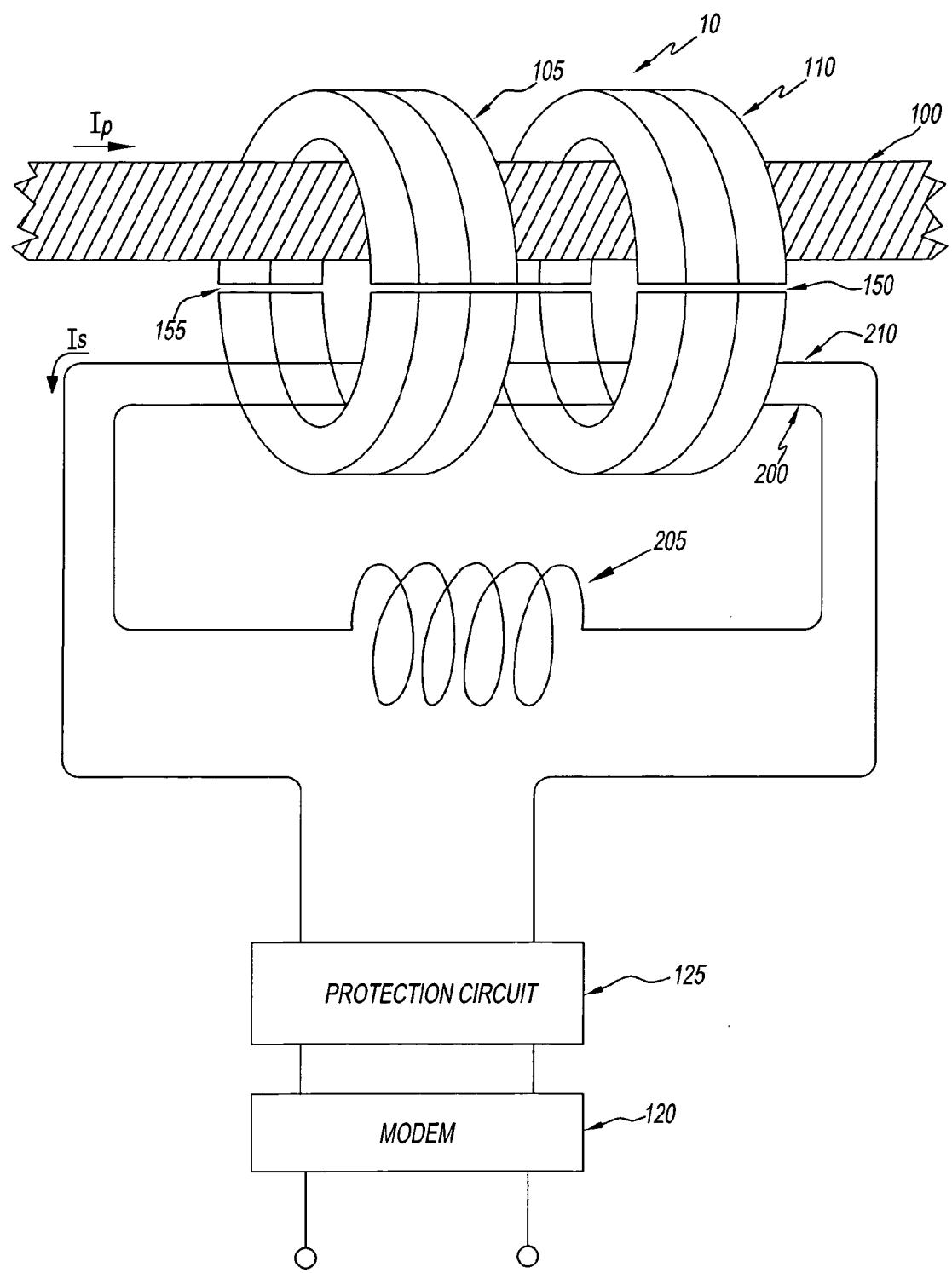

FIG. 2b shows the addition of a second magnetic core 110 to core 105. Magnetic core 110 has a high magnetic permeability at a power frequency. This increases the magnetization impedance of tertiary winding 200 so as to increase the ratio of tertiary current to primary power line current.

Figure 3:
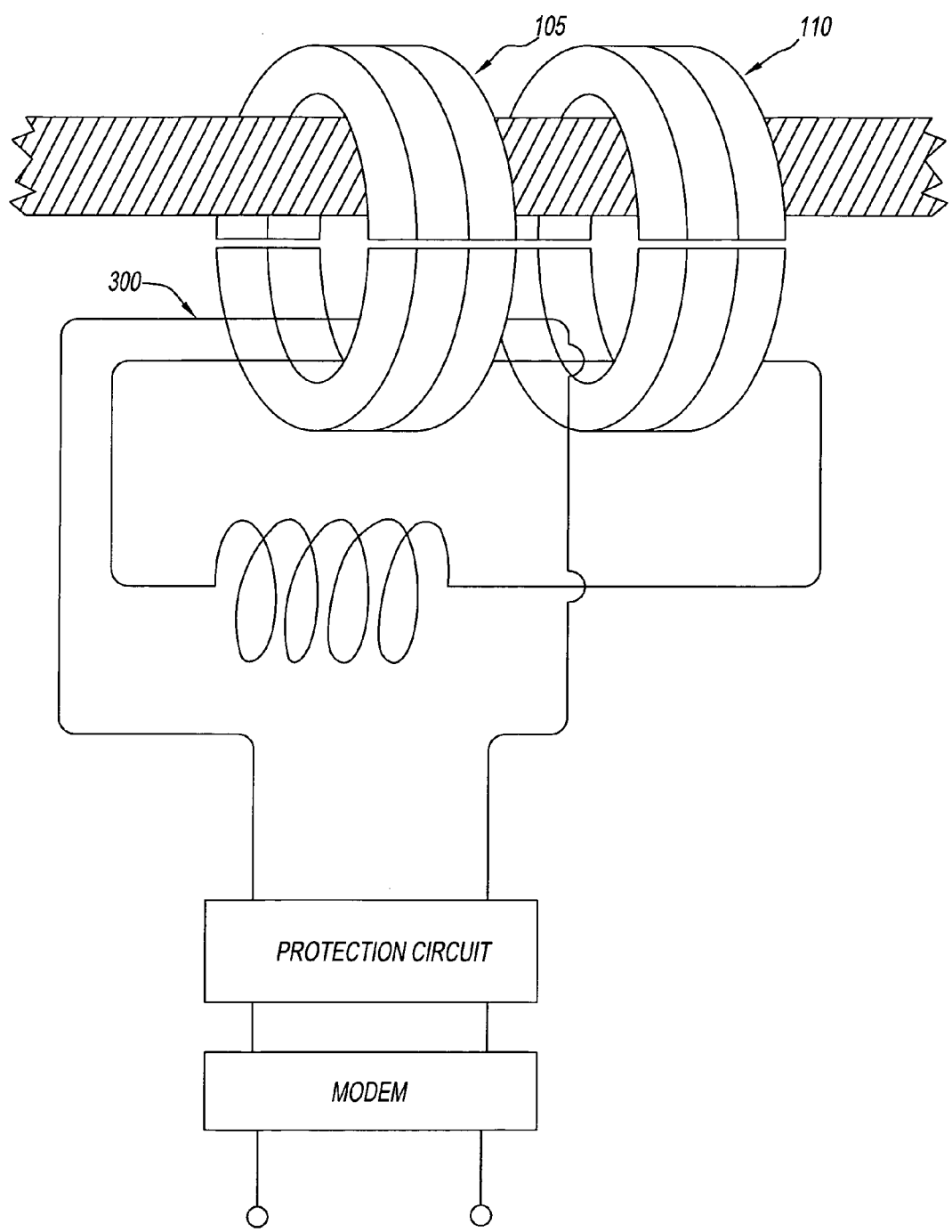
FIG. 3 shows another embodiment with a tertiary winding.

FIG. 3 shows the structure of another alternative implementation, which differs from that of FIG. 2b in that a winding 300 passes through high frequency core 105 only, but not through power frequency core 110.

Figure 4A:
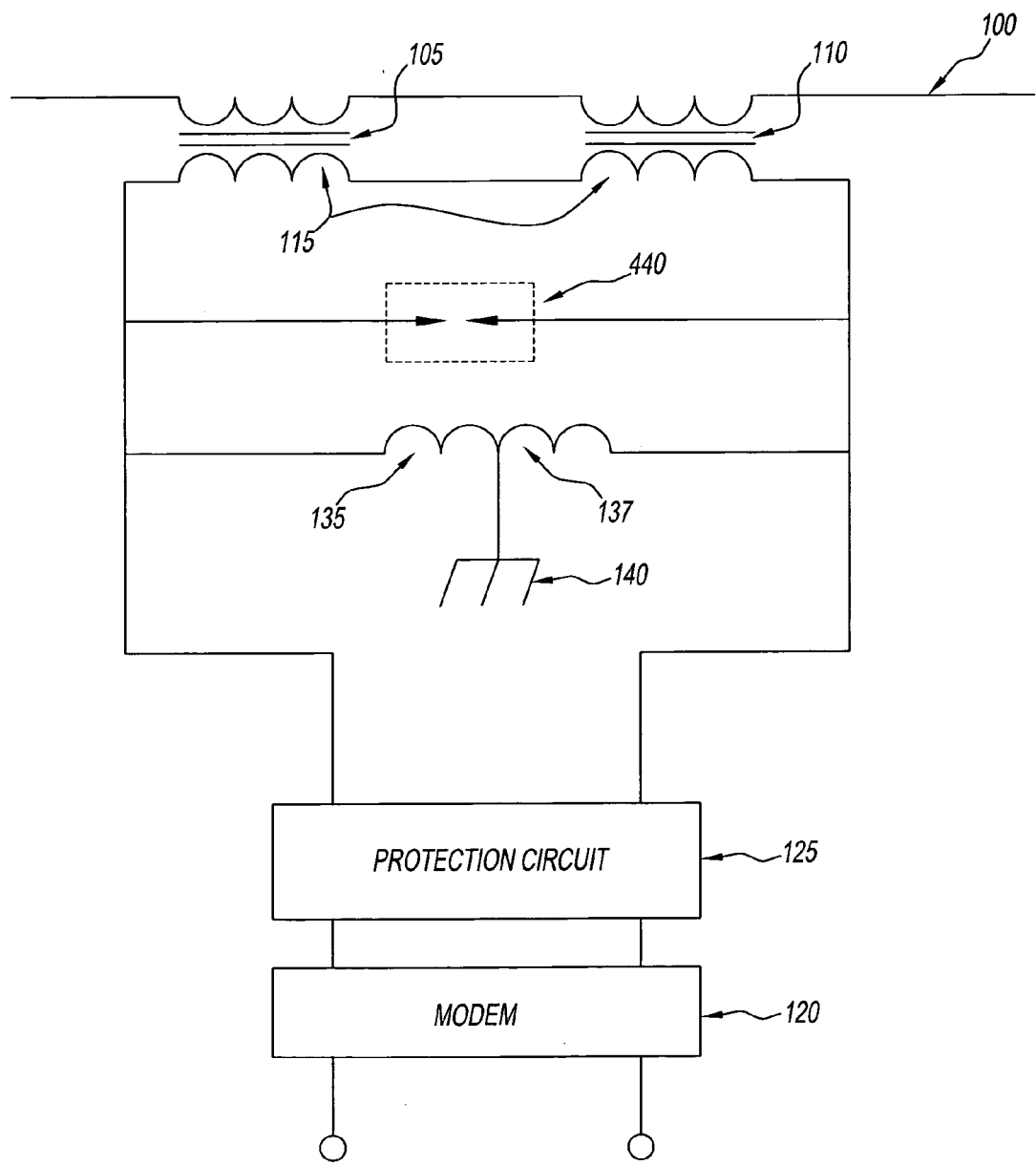
FIGS. 4a–4c show schematic diagrams of the structures shown in FIGS. 13.
Figure 4B:
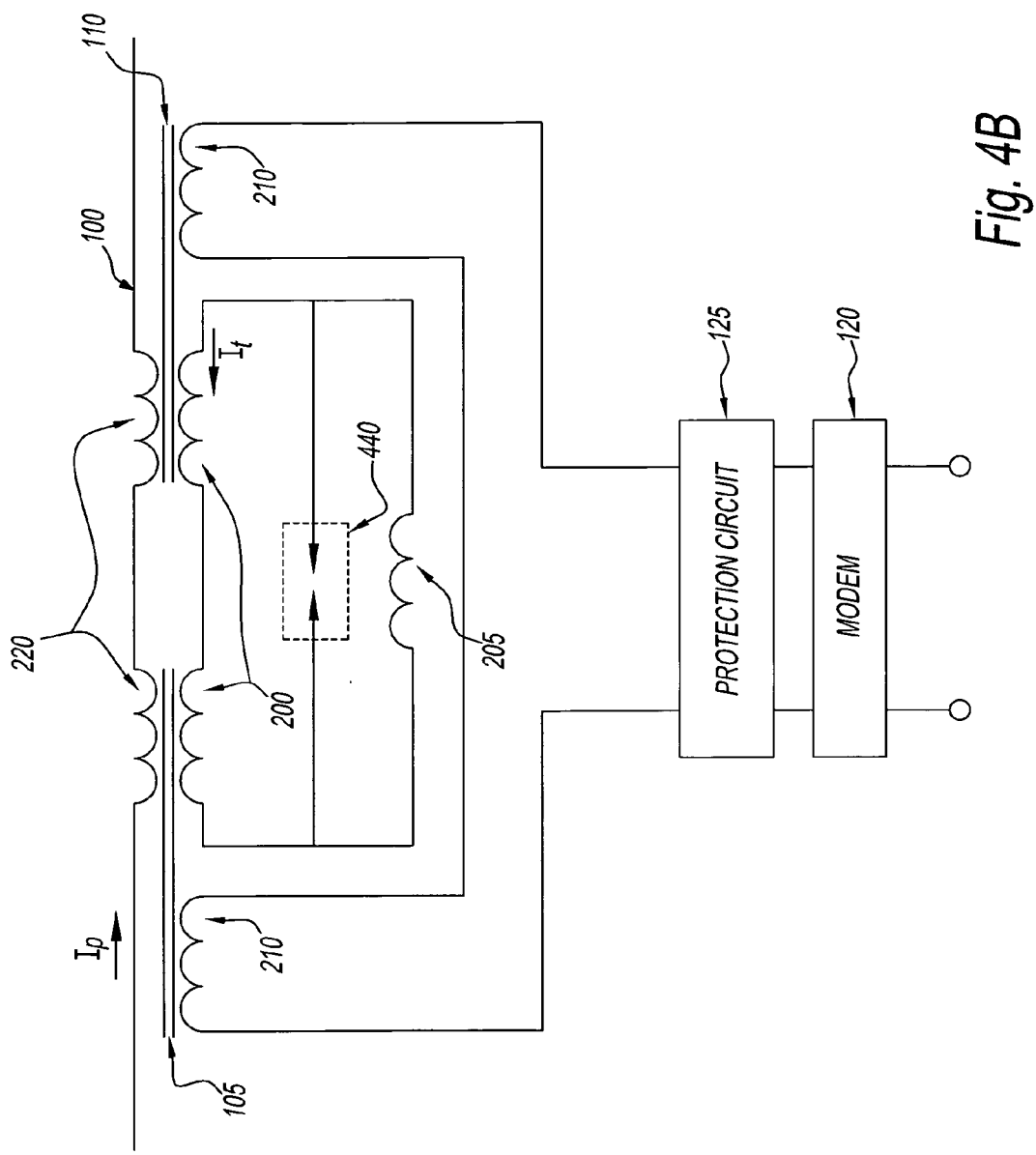
Figure 4C:
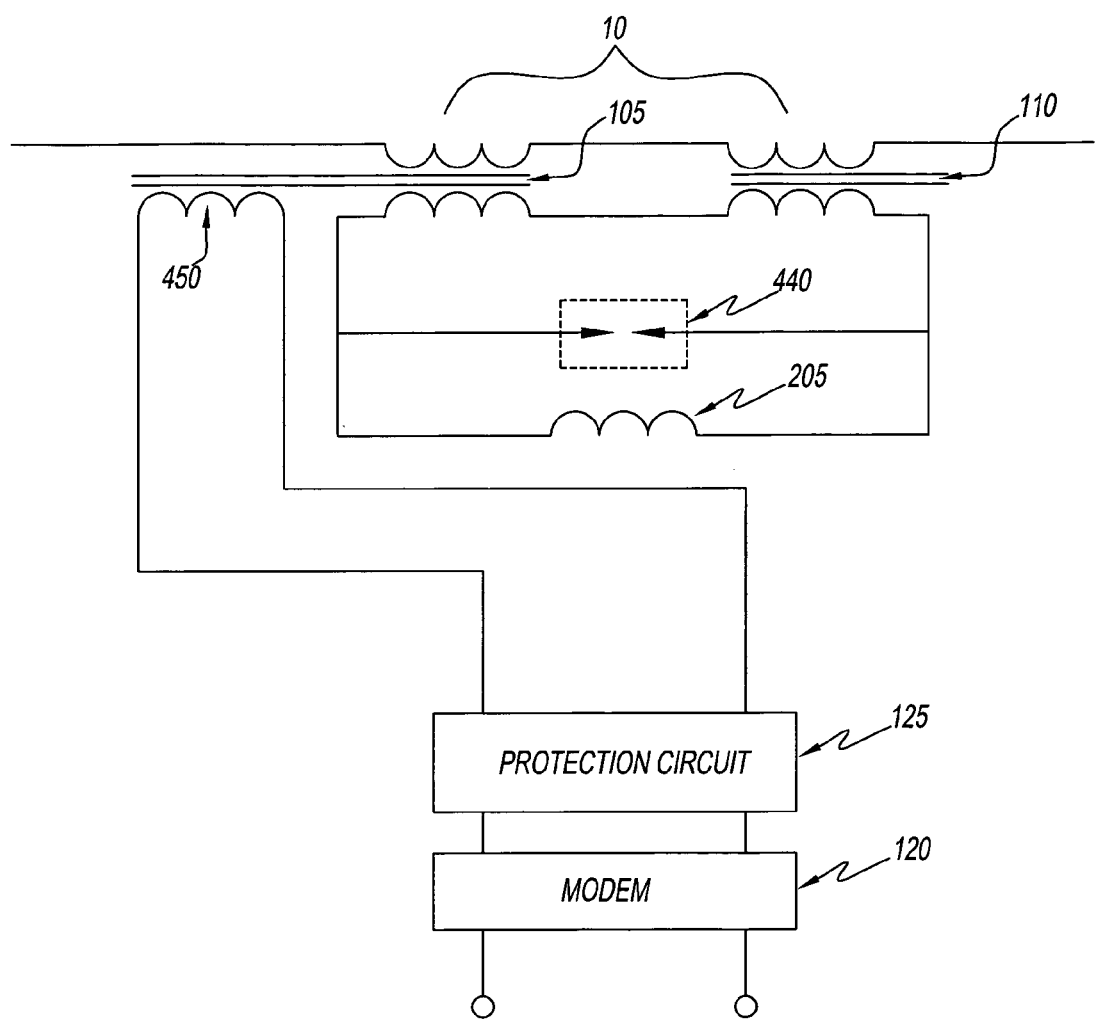

FIGS. 4a, 4b, and 4c are schematic diagrams corresponding to the structures in FIGS. 1b, 2b and- 3 respectively, and add an optional spark gap or gas tube surge arrestor 440. Spark gap or surge arrestor 440 absorbs energy that may be induced from power line 100 by lightning or other electrical surge conditions. Items 105, 110, 120, 125, 135, 137 and 140 are schematic representations of corresponding items in FIG. 1b.

Referring to FIG. 4b, quantitatively, a power current $I_p$ flows through power line 100, which serves as a primary winding 220, inducing in tertiary winding 200 an oppositely directed current $I_t = eI_p/M$, where e is an "efficiency factor" that may approach unity, $I_p$ is the primary current, and M is the number of turns in tertiary winding 200. When e=1, the flux in cores 105 and 110 is zero. The power frequency current in winding 210 can be neglected, as the impedance matching and surge protection circuit 125 is designed with sufficient resistance as to reduce the circulation current to below one ampere (for example see provisional patent application No. 60/364,321, filed Mar. 14, 2002). Factor e will approach 1 if cores 105 and 110 provide near-unity coupling coefficient, and the ratio of the impedance of signal frequency choke 205 to the magnetization impedance of tertiary winding 200 is much less than unity at power frequency.

Embodiments of the invention are useful even if e deviates from unity because the magnetomotive force in high frequency core 105 is still reduced by a factor of 1−e. For example, for I=1000 amperes and e=0.9, the magnetomotive force in the high frequency core(s) 105 is reduced to 100 ampere-turns, manageable with currently available materials and a modest air gap.

For currents in the range of several hundred amperes and above, tertiary winding 200 may be constructed of a few turns, to allow use of smaller, more flexible wires, as the resultant magnetomotive force cancellation is a product of the current in tertiary winding 200 and the number of turns. As in a current transformer, the secondary current is inversely related to the primary current by the turns ratio, but the product of the current multiplied by the number of turns remains constant.

If the power line current exceeded a design current of coupler 10, excessive current might flow in secondary 115 and overheat or melt the insulation of secondary 115 or choke coil 135. One way to avoid such damage is to select a power frequency core material that reaches saturation at the maximum rated current of conductor for secondary 115 and choke coil 135, thus limiting the induced current in the power frequency secondary.

For embodiments having separate secondaries for signal and flux-cancellation, as shown in FIGS. 3 and 4c, a secondary 450 is dedicated to signal coupling and does not pass through the additional power frequency high permeability core 110, reducing the coupling of low frequency noise into the signal circuit represented by impedance matching circuit 125 and modem 120, and reducing eddy current losses.

Current surges due to lightning, switching transients, etc., that have a high slew rate, might induce large voltages in choke 205 and might produce insulation breakdowns destructive to insulation. Spark gap or gas tube arrestor 440 can be built into choke 205 or in close proximity and protect against these events.

The flux-canceling secondary circuit, comprising secondary 115 and choke coil 135 in FIG. 1a, in a power line coupler 10 can be extended for additional useful functionality, namely the measurement of the magnitude of the primary current flowing in the power wire. When such an inductive coupler is installed on a power line, a power frequency current flows through choke coil 135 at a magnitude roughly proportional to the power line current, while itself being insulated from primary potentials. Thus, this arrangement can sense and monitor current in the primary winding, that is, the main power line.

Figure 5:
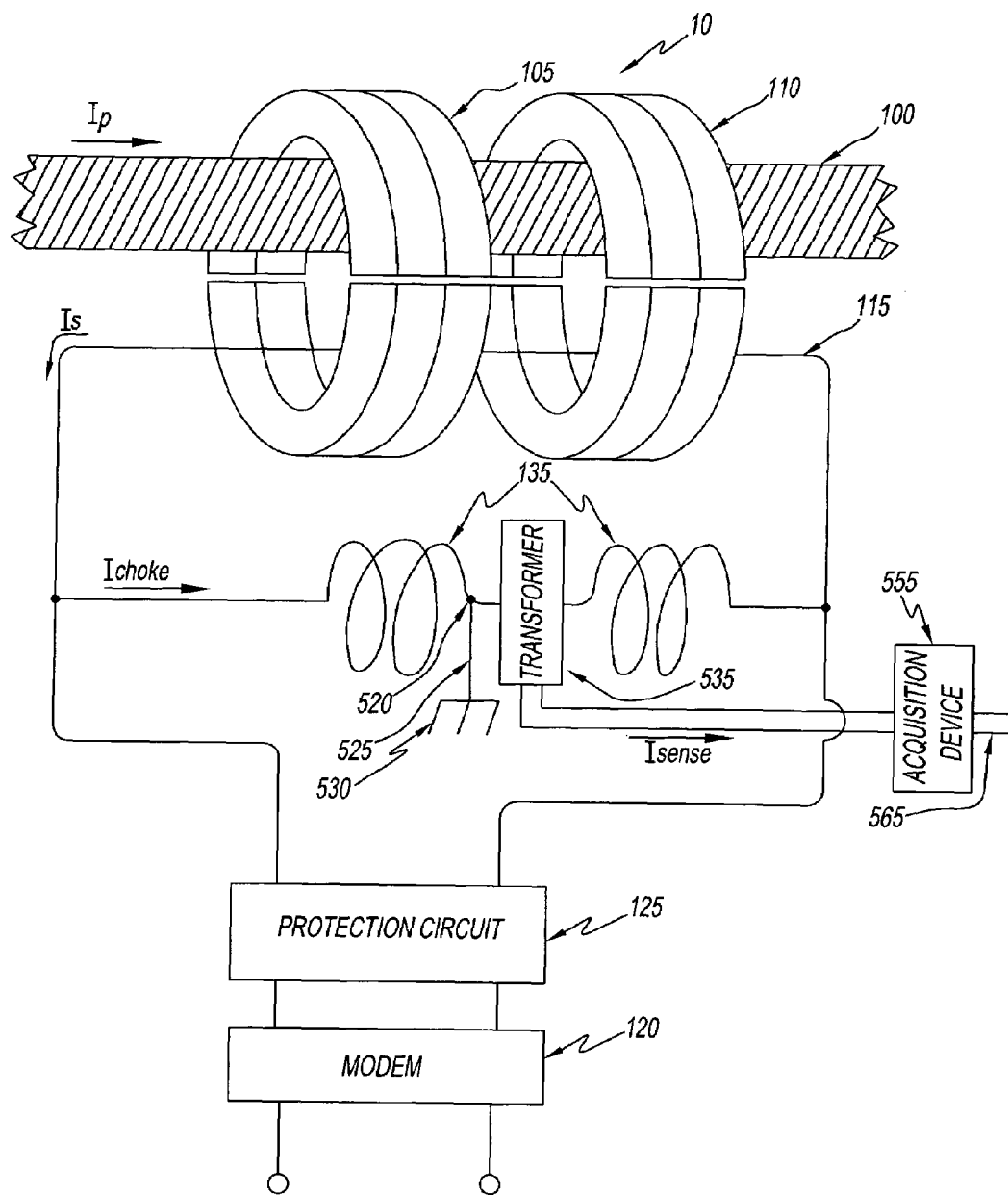
FIG. 5 shows a further embodiment of the invention that senses current in the power line.

FIG. 5 is a diagram showing an embodiment directed at such power line current sensing, and takes FIGS. 1b and 4a as its starting point.

This system includes (a) a first current transformer through whose cores 105 and 110 power line 100 passes as a primary winding, and a secondary winding 115, terminated by a choke coil 135, such that current in secondary 115 is opposite in direction and proportional in magnitude to power current in power line 100, and (b) a second current transformer 535 having a portion of choke coil 135 or one of its leads as a primary winding and developing in a secondary winding circuit a current sensing signal proportional to the secondary current and thus to the power current.

Since choke coil 135 is grounded, only minimal insulation is required for such a current sensing arrangement, and cost may be kept very low. Also, modem 120 connects to a communication system (not shown), and thus the output of current sensing transformer 535 may be conveniently connected to an interface device, e.g., signal acquisition device 555, that converts a sensed current signal from current sensing transformer 535 to a digital value and sends the digital value to a power utility's monitoring location.

FIG. 5 shows power line 100 passing through cores 105 and 110. Secondary 115 and choke coil 135 form a secondary circuit. Choke coil 135, shown split into two halves, includes a center tap point 520 connected via a conductor 525 to neutral or ground 530. Current sensing transformer 535 is clamped around a conductor at some point on the secondary circuit. The output of current sensing transformer 535, $I_{sense}$, is connected to signal acquisition device 555, which in turn is connected via wires 565 to communications equipment (not shown). The current sensing indication is thus conveniently transportable over the same communications system that modem 120 serves.

Current $I_{sense}$ is proportional to choke coil current $I_{choke}$. High pass components in matching network 125 block the flow of power frequency current, so $I_{choke}=I_S$ at power frequency. $I_S$ is proportional to power line current $I_P$, thus $I_{sense}$ is proportional to $I_p$. The ratio between the magnitude $I_p$ flowing in power line 100 and current sensing current $I_{sense}$ reaching signal acquisition device 555 is used in calibrating the signal acquisition device 555.

As power frequency current $I_p$ increases, the saturation of cores 105 and/or 110 becomes significant, and the ratio of $I_{sense}/I_p$ decreases, thus reducing the accuracy of measurement of $I_p$. To compensate for such saturation, the ratio of $I_{sense}/I_p$ may be measured over a range of power frequency current $I_p$, and a hardware or software proportionality compensating mechanism may be added to offset changes in the ratio.

Current sensing transformer 535 is preferably placed proximal to the point of attachment of center tap point 520 to conductor 525. This reduces the effect of stray capacitance to ground on a high frequency circuit of which choke coil 135 is a part.

Figure 6:
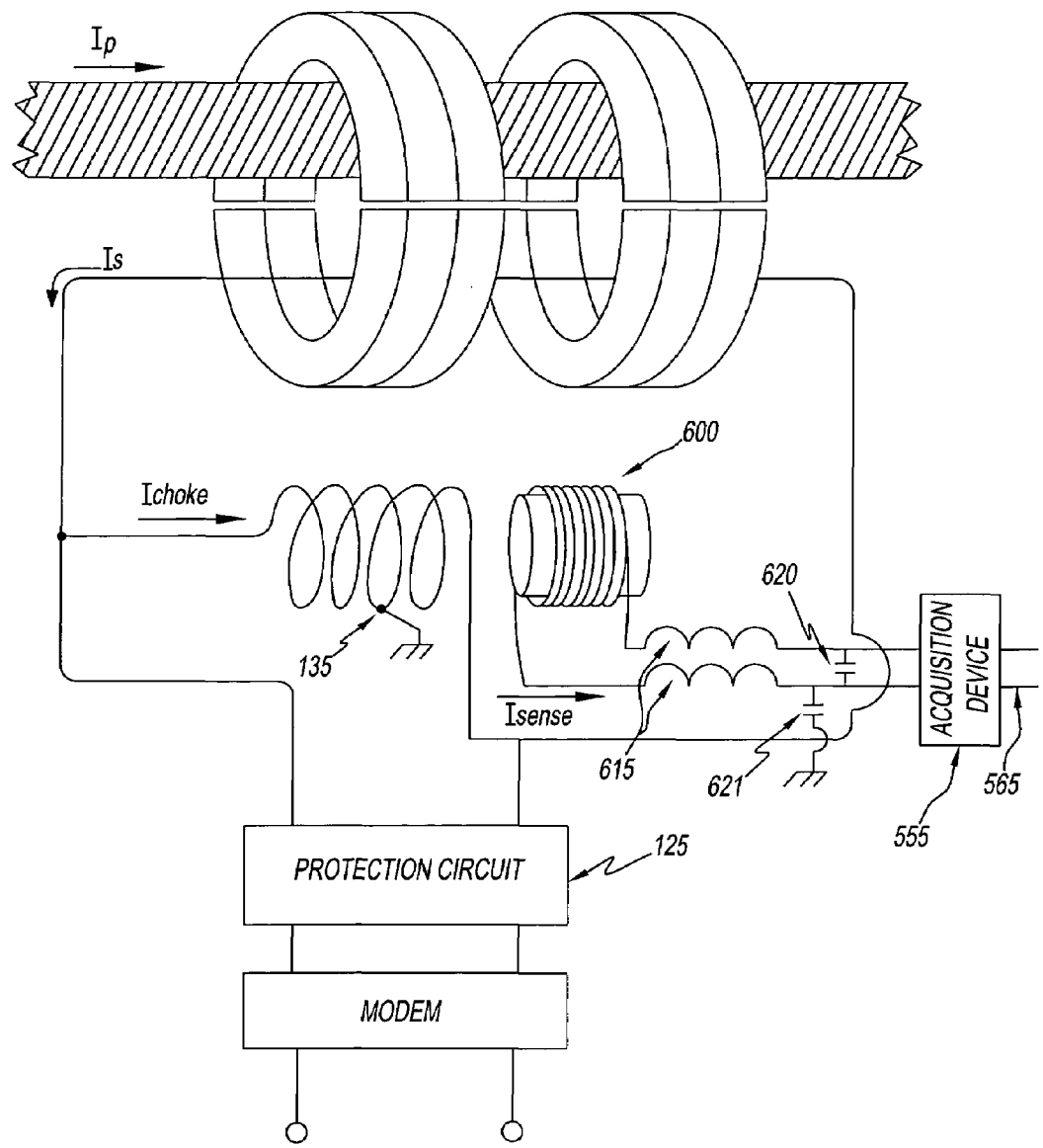
FIG. 6 shows another embodiment of the invention for sensing power line current.

FIG. 6 shows an alternative arrangement that uses a current sensing coil rather than having current sensing transformer 535 placed around a conductor of choke coil 135 as in the embodiment of FIG. 5. Current sensing coil 600 is located coaxially with choke coil 135, and can be considered a secondary of a transformer formed by choke coil 135 and current sensing coil 600. This relationship holds whether choke coil 135 and/or sensing coil 600 have a nonmagnetic or magnetic core.

The power frequency component of $I_{sense}$ induced in current sensing coil 600 is fed to current measuring circuit 555, which communicates with current monitoring equipment (not shown) as part of an electrical utility distribution grid (not shown). Current $I_{sense}$ is proportional to choke coil current $I_{choke}$ due to transformer induction between choke 135 and sensing coil 600. $I_S$ is proportional to power line current $I_p$, thus $I_{sense}$ is proportional to $I_p$. The resulting device including coupler 10 and current sensing coil 600 represents a current transformer that may be placed around energized lines without disrupting service to power customers.

Sensing coil 600 is near coil 135, which has high frequency signal current flowing through it and high frequency voltages across its terminals and with respect to ground. Rf chokes 615 are connected in series with the terminals of sensing coil 600 so as to block any flow of high frequency current, and capacitor 620, which short circuits any residual high frequency voltage and prevents its connection to current measuring circuit 555. Capacitor 621 may also be added to bypass any common mode high frequency current to ground. The calibration of 555 and the routing of data via lines 565 is identical to that discussed for FIG. 5, above.

Although various exemplary embodiments of the invention have been disclosed, it should be apparent to those skilled in the art that various changes and modifications can be made that will achieve some of the advantages of the invention without departing from the true scope of the invention. The present invention is intended to embrace all such changes and modifications that fall within the scope of the appended claims.

What is claimed is:

1. A power line data coupler, comprising:
   a magnetic core having a high magnetic permeability at a data communication frequency and being configured to allow a power line of a power distribution system to be routed through said magnetic core to serve as a primary winding;
   a data signaling circuit that provides a secondary winding through said magnetic core for coupling a data signal between said power line and a communication device; and
   a choke coil coupled to said data signaling circuit, across said secondary winding, for creating a flux-canceling power frequency current opposite in direction and comparable in magnitude to a power frequency current.

2. The coupler of claim 1, wherein said magnetic core is a first magnetic core, and wherein said coupler further comprises a second magnetic core having a high magnetic permeability at a power frequency and being configured to allow said power line and said secondary winding to be routed through said second magnetic core so as to increase power frequency impedance of said secondary winding.

3. The coupler of claim 2, wherein said data signaling circuit secondary winding is wound around said first magnetic core, but not wound over said second magnetic core.

4. The coupler of claim 2, wherein said second magnetic core saturates at a maximum power line current level.

5. The coupler of claim 1, wherein said choke coil has a low impedance at said power frequency and a high impedance at said data communication frequency.

6. The coupler of claim 5, further comprising a device connected in parallel with said choke coil for absorbing energy from an electrical surge.

7. The coupler of claim 1, wherein said choke coil has a total impedance much lower than half of a magnetization reactance of said secondary winding.

8. The coupler of claim 1, wherein said choke coil is connected to an electrical ground.

9. The coupler of claim 1, wherein said choke coil has a center tap connected to an electrical ground.

10. The coupler of claim 1, wherein said secondary winding has multiple turns about said core.

11. The coupler of claim 10, further comprising a current sensing transformer that employs said choke coil as a primary winding for developing a current sensing signal proportional to said power frequency current.

12. The coupler of claim 11, wherein said current sensing signal is communicated to said communication device.

13. The coupler of claim 11, wherein said current sensing transformer includes a magnetic core having an air gap.

14. The coupler of claim 11, further comprising a proportionality compensating mechanism for maintaining a relatively constant ratio between said current sensing signal and said power frequency current as magnitude of said power frequency current changes.

15. The coupler of claim 1, wherein said magnetic core includes an air gap.

16. A power line data coupler, comprising:
a magnetic core having a high magnetic permeability at a data communication frequency and being configured to allow a power line of a power distribution system to be routed through said magnetic core to serve as a primary winding;
a data signaling circuit that provides a secondary winding through said magnetic core for coupling a data signal between said power line and a communication device; and
a flux-canceling circuit that includes a tertiary winding through said magnetic core and a choke coil across said tertiary winding, for creating a flux-canceling power frequency current opposite in direction and comparable in magnitude to a power frequency current.

17. The coupler of claim 16,
wherein said magnetic core is a first magnetic core, and
wherein said coupler further comprises a second magnetic core having a high magnetic permeability at a power frequency and being configured to allow said power line and said tertiary winding to be routed through said second magnetic core, so as to increase power frequency impedance of said tertiary winding.

18. The coupler of claim 17, wherein said secondary winding is not wound over said second magnetic core.

19. The coupler of claim 17, wherein said secondary winding is wound over said second magnetic core.

20. A system of sensing current on a power distribution system power line, the system comprising:
a first current transformer that utilizes a power line of a power distribution system as a primary winding and a secondary winding connected to a choke coil, such that current in said choke coil is proportional to power current in said power line; and
a second current transformer having a conductor of said choke coil as a primary winding and developing in a secondary winding circuit a current sensing signal proportional to said power current.

21. The system of claim 20, wherein said choke coil is connected to an electrical ground.

22. The system of claim 21, wherein said second current transformer is located proximal to a point where said choke coil is connected to said electrical ground.

23. The system of claim 20, further comprising a signal acquisition device for converting said current sensing signal to a digital value.

24. The system of claim 23, wherein said digital value is provided to a computer network.

25. The system of claim 20, further comprising a proportionality compensating mechanism for maintaining a relatively constant ratio between said current sensing signal and said power current as magnitude of said power current changes.

* * * * *

UNITED STATES PATENT AND TRADEMARK OFFICE
CERTIFICATE OF CORRECTION

| | |
|---|---|
| PATENT NO. | : 7,061,370 B2 |
| APPLICATION NO. | : 10/425816 |
| DATED | : June 13, 2006 |
| INVENTOR(S) | : Yehuda Cern |

Page 1 of 1

It is certified that error appears in the above-identified patent and that said Letters Patent is hereby corrected as shown below:

Col. 3, Line 17.

The patent presently states, "FIGS. 4a-4c show schematic diagrams of the structures shown in FIGS. 13."

This should have read --FIGS. 4a-4c show schematic diagrams of the structures shown in FIGS. 1-3.--

Signed and Sealed this

Fifth Day of September, 2006

JON W. DUDAS
*Director of the United States Patent and Trademark Office*